United States Patent [19]

Halbert et al.

[11] Patent Number: 5,026,473

[45] Date of Patent: Jun. 25, 1991

[54] TRANSITION METAL TRIS-DITHIOLENE AND RELATED COMPLEXES AS PRECURSORS TO ACTIVE CATALYSTS

[75] Inventors: Thomas R. Halbert, Annandale; Russell R. Chianelli, Somerville; Edward I. Stiefel, Bridgewater; Allan J. Jacobson, Princeton, all of N.J.

[73] Assignee: Exxon Research & Engineering Company, Florham Park, N.J.

[21] Appl. No.: 521,952

[22] Filed: May 11, 1990

Related U.S. Application Data

[62] Division of Ser. No. 378,565, Jul. 11, 1989, Pat. No. 4,962,077.

[51] Int. Cl.$^5$ .................. C10G 45/08; C10G 45/00
[52] U.S. Cl. .................. 208/143; 208/112; 208/111; 208/215; 208/216 R; 208/251 H; 208/254 H
[58] Field of Search .................. 208/112 L, 112, 111, 208/143, 215, 251 H, 254 H, 216 R

[56] References Cited

U.S. PATENT DOCUMENTS

| | | | |
|---|---|---|---|
| 4,483,762 | 11/1984 | Grosboll | 208/251 H |
| 4,557,821 | 12/1985 | Lopez et al. | 208/251 H |
| 4,557,823 | 12/1985 | Kukes et al. | 208/251 H |
| 4,560,468 | 12/1985 | Kukes et al. | 208/251 H |
| 4,564,441 | 1/1986 | Kukes et al. | 208/251 H |
| 4,578,179 | 3/1986 | Kukes et al. | 208/251 H |
| 4,582,594 | 4/1986 | Kukes et al. | 208/251 H |
| 4,705,619 | 11/1987 | McCandlish et al. | 208/112 |

*Primary Examiner*—Helane E. Myers
*Attorney, Agent, or Firm*—Joseph J. Dvorak

[57] ABSTRACT

The present invention is based on the discovery that certain transition metal containing complexes thermally decompose to form solids containing the transition metal, sulfur and carbon and that these transition metal, sulfur and carbon containing solids are particularly suitable as catalysts for hydrodesulfurization, hydrodenitrogenation and aromatics hydrogenation. The transition metal complexes that are thermally decomposed to novel catalysts are complexes of the type represented by the general formula $ML^n3$, wherein M is selected from Mo, W, Re and mixtures thereof, L is a dithiolene or aminobenzenethiolate ligand, and n represents the total charge of the metal complexes, and is 0, −1, or −2.

5 Claims, No Drawings

TRANSITION METAL TRIS-DITHIOLENE AND RELATED COMPLEXES AS PRECURSORS TO ACTIVE CATALYSTS

This is a division of application Ser. No. 378,565, filed Jul. 11, 1989.

FIELD OF THE INVENTION

This invention relates generally to catalytic hydrotreating of petroleum feedstocks and more specifically to novel transition metal-containing catalysts especially suitable for hydrodesulfurization, hydrodenitrogenation, and aromatics hydrogenation.

BACKGROUND OF THE INVENTION

Transition metal tris-dithiolene complexes and the related ortho-aminobenzenethiolate complexes have been reported in the literature. See, for example, Burns, R. P. et al., *Adv. Inorg. Chem. Radiochem.*, 22, p. 303-348 (1979) and references therein; and Gardner, Joseph K. et al., *Inorg. Chem*, 17, p. 897-904 (1978). Molybdenum tris-dithiolene complexes have been reported as catalysts for the isomerization of norbornadiene to quadricyclane. See R. B. King, *J. Mol. Cat.*, 4, p. 361-373 (1978).

SUMMARY OF THE INVENTION

It has now been discovered that certain transition metal-containing complexes thermally decompose to form solids containing the transition metal, sulfur and carbon and that these transition metals, sulfur and carbon containing solids are particularly suitable as catalysts for hydrodesulfurization, hydrodenitrogenation and aromatics hydrogenation. The transition metal-containing complexes that are thermally decomposed to novel catalysts are complexes of the type represented by the general formula $ML^n_3$ wherein M is a transition metal selected from Mo, W, Re or mixtures thereof and L is a dithiolate or aminobenzenethiolate ligand, and n represents the total charge of the metal complex, and is 0, −1, or −2.

DETAILED DESCRIPTION OF THE INVENTION

The catalysts of the present invention are prepared by the thermal decomposition of transition metal tris-dithiolate and aminobenzenethiolate complexes of the type $ML^n_3$ in which M is a metal selected from Mo, W, Re and mixtures thereof, n represents the total charge of the metal complex and is 0, −1, or −2, and L is a ligand selected from dithiolene or aminobenzenethiolate ligands having the general formula

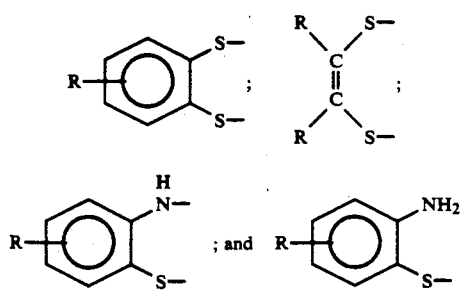

and in which R is selected from alkyl, aryl and alkyl aryl groups, and when the ligand, L, is a dithiolene, R may also be $CF_3$ or CN.

In general, when R is an alkyl group, it will have from 1 to about 12 carbon atoms. When R is an aryl group, it will have 6 carbon atoms. Finally, when R is an alkylaryl group, it will have from about 7 to about 18 carbon atoms.

As will be readily appreciated, when n is other than zero, the complex will include a cation such as an ammonium, alkylammonium, and quaternary alkylammonium anion.

Examples of preferred complexes include $Mo(tdt)_3$, $Mo(abt)_3$, $(TEA^+)_2Mo(tdt)_3$, $W(abt)_3$ and $Re(abt)_3$ wherein tdt is 3,4-toluene dithiolate, abt is ortho-aminobenzenethiolate, and TEA is tetraethylammonium anion.

The preparation of these precursors is well known and does not form a part of this invention. Methods used to prepare them, for example, may be found by consulting the references cited above.

These compounds have been found to be useful catalyst precursors in the preparation of catalysts for hydrodesulfurization (HDS), hydrodenitrogeneration (HDN), and aromatics hydrogenation. For example, when charged into a batch-type stirred reactor containing a mixture of 5 weight percent dibenzothiophene (DBT) and decalin, $Mo(tdt)_3$ was effective in removing sulfur from the mixture. In another example, using a mixture containing 0.8 weight percent sulfur as DBT, 0.8 weight percent nitrogen as 1,2,3,4-tetrahydroquinoline (THQ), and 5 weight percent acenapthylene in decalin, $Mo(abt)_3$ was effective in removing nitrogen and hydrogenating the acenapthylene.

The molybdenum tris-dithiolene and related complexes may be thermally decomposed by heating the complex at elevated temperatures generally in excess of about 200° C., and preferably in the range of about 250° to 350° C., in a reducing atmosphere such as one containing hydrogen. The decomposition preferably is conducted in the presence of a solvent. Indeed, the precursors may be thermally decomposed in the petroleum hydrocarbon being catalytically hydrotreated.

The molybdenum, tungsten and rhenium trisdithiolene and related complexes are examples of catalyst precursor molecules in which sulfur and carbon are covalently bound in the metal complex. We refer to these molecules as "inner sphere" sulfur-and carbon-containing precursors. The advantageous nature of these complexes as catalyst precursors is believed to derive from the presence of this "inner sphere" sulfur and carbon during the decomposition to form the active catalytic material.

The precursors, of course, may be used either singly or mixed with one another for forming catalysts of the present invention.

The invention will be further understood by reference to the following examples.

EXAMPLE 1

Molybdenum tris(toluene-3,4-dithiolate) was prepared by the following procedure:

Toluene-3,4-dithiol (5.9 g, 0.38 mole) was dissolved in a solution containing 15 ml 5% aqueous sulfuric acid and 135 ml 95% ethyl alcohol. A solution of $Na_2MoO_4$ (2.49 g, 0.126 mole) in 150 ml water was added rapidly with strong stirring. After stirring for 40 min, the mixture was extracted 2 times with 250 ml $CHCl_3$. The extracts were washed with water, and dried over anhydrous $MgSO_4$. The chloroform solution was mixed with 200 cc dry silica gel, and solvent removed under reduced pressure. The resulting mixture was poured onto a column of dry silica (60×7 cm). Elution with 2:1 hexane/$CHCl_3$ gave 1.85 g pure Mo (tdt)$_3$.

EXAMPLE 2

The following describes the preparation of molybdenum tris(aminobenzenethiolate). o-Aminobenzenethiol (2.2 g) was dissolved in 10 ml 5% $H_2SO_4$ and 90ml 95% ethanol. A solution of $Na_2MoO_4$ (1.62 g) was poured into the aminobenzenthiol solution with vigorous stirring. After 10 minutes, the stirring was stopped, and the mixture allowed to stand for 30 min. Filtration gave (after drying) 2.8 g green solid Mo(abt)$_3$.

EXAMPLE 3

Bis(tetraethylammonium)-molybdenum-tris (toluene-3,4-dithiolate) was prepared as follows: Mo(tdt)$_3$ (2.03 g) was dissolved in 120 ml tetrahydrofuran under inert atmosphere. A solution of n-butyllithium (4.6 ml, 1.5M solution in hexane) was added slowly. After stirring ½ hour, tetraethyl ammonium bromide (excess) was dissolved in 50 ml methanol, and added. The product (1.4 g. blue-black solid) was precipitated by addition of 250 ml diethylether, filtered, and dried.

EXAMPLE 4

Rhenium tris-aminobenzenethiolate (Re(abt)$_3$) was prepared as follows:

A solution containing 5.0 g. (0.017 mole) of potassium perrhenate in 500 ml hot water was added to a solution of 6.0 ml o-aminobenzenethiolate and 50 ml 5% $H_2SO_4$ in 500 ml 95% ethanol. After heating for one hour at 100° C., the resulting brown crystalline material was filtered, washed with ethanol and ether, and dried. This solid was dissolved in 500 ml acetone, filtered and the filtrate diluted with 250 ml water. After standing for 3 days, the precipitated dark blue needles of Re(abt)$_3$ were filtered and dried.

EXAMPLES 5, 6 AND 7

The precursors of Examples 1 through 3 were made into 20–40 mesh (U.S. Sieve size) particles and placed in an autoclave reactor basket. The autoclave was charged with 100 cc's of 5 weight percent dibenzothiophene (DBT) in decalin. The autoclave was heated at 350° C. while flowing hydrogen through the reactor at 100 cc's per minute with a 750 rpm spinning rate for the basket. The concentrations of DBT and products were determined by gas chromatography. The results are shown in Table I below.

TABLE I

| Experiment | Precursor | HDS Activity* |
|---|---|---|
| Ex. 5 | Mo(tdt)$_3$ | 93 |
| Ex. 6 | Mo(abt)$_3$ | 41.5 |
| Ex. 7 | (TEA)$_2$Mo(tdt)$_3$ | 76 |
| Comp. Ex. 8 | (NH$_4$)$_2$MoS$_4$ | 28 |

*(× 10$^{16}$ molecules DBT/g precursor sec)

COMPARATIVE EXAMPLE 8

Molybdenum sulfide catalyst was prepared as follows: Ammonium tetrathiomolybdate (NH$_4$)$_2$MoS$_4$, (10 g) was heated at 350° C. for two hours under a flow of gas consisting of 15% $H_2S$ in $H_2$. The resulting MoS$_2$ was cooled under $H_2S/H_2$ gas to 100° C., then cooled to room temperature under nitrogen.

Following the procedure of Examples 5, 6 and 7, 1 gram of molybdenum sulfide prepared in this way was used in the hydrodesulfurization of DBT. The results are also shown in Table I.

EXAMPLE 9

This example illustrates the ex-situ formation of an active HDS/HDN catalyst (preforming). A sample of Mo(abt)$_3$ (2 g) was placed in a 300 cc autoclave with 200 ml decalin. The autoclave was pressurized to 225 psi with $H_2$, and then heated to 350° C. for several hours. After cooling to room temperature, the reactor contents were filtered, and the black solid catalyst washed with toluene, dried in vacuo, and used in subsequent testing. The surface area of this material was determined to be 71.2 m$^2$/g. Elemental analysis of the catalyst gave the following results: C, 6.67%; H, 1.12%; N, 0.68%; Mo, 45.72%; S, 35.07%.

EXAMPLES 10, 11 AND 12

The precursor of Examples 2 and 4, and the preformed catalyst from Example 9, were placed in separate autoclaves. Each autoclave was charged with 100 cc's of feed containing 0.8 wt. percent sulfur as dibenzothiophene, 0.8 wt. percent nitrogen as 1,2,3,4-tetrahydroquinoline, and 5 wt. percent acenapthylene. The autoclave was heated at 350° C., while flowing $H_2$ through the reactor at 100 cc's per minute. The mixture of feed and catalyst was stirred at 750 rpm. Concentrations of desulfurized products (biphenyl and cyclohexyl benzene), denitrogenated products (propylbenzene, propylcyclohexane, propylcyclohexene), and hexahydroacenapthylene were determined by gas chromatography of samples of the product withdrawn from the reactor at intervals during each 7 hour run. Zero-order rates of HDS, HDN, and hydrogenation are shown in Table II.

TABLE II

| Experiment | Catalyst | HDS Activity | HDN Activity | Hydrogenation Activity |
|---|---|---|---|---|
| Ex. 10 | Mo(abt)$_3$ (Ex. 2) | 15.2 | 31 | 23 |
| Ex. 11 | Re(abt)$_3$ (Ex. 4) | 9.4 | 70.5 | 45 |
| Ex. 12 | Mo(abt)$_3$ (Ex. 9) | 5.1 | 17.1 | 10.8 |
| Comp. Ex. 13 | MoS$_2$ | 1.0 | 23 | 5.0 |

COMPARATIVE EXAMPLE 13

The procedure of Examples 10, 11 and 12 were followed, except that the catalyst from Comparative Example 8 was employed. The results are shown in Table II.

What is claimed is:

1. A process for hydrotreating petroleum feedstocks to lower the sulfur, nitrogen and aromatic contents thereof comprising: contacting a petroleum feedstock at an elevated temperature of above about 200° C. and in the presence of hydrogen with a catalyst formed by heating a precursor ML$^n$$_3$ wherein M is a metal selected from Mo, W, Re and mixtures thereof, n represents the total charge of the metal complex and is 0, −1, or −2; L is selected from dithiolene or aminobenzenethiolate ligands having the formula

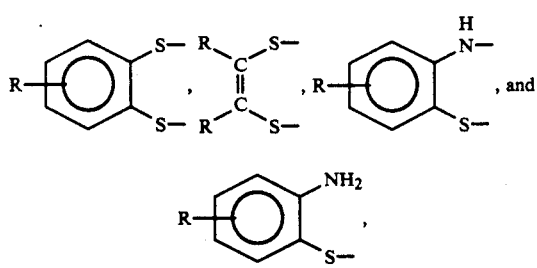

wherein R is an alkyl, aryl or alkylaryl group and when L is a dithiolene, R also is $CF_3$, or CN, the heating being conducted at temperatures of from about 200° C. to about 350° C. in a reducing atmosphere for a time sufficient to form said catalyst.

2. The process of claim 1 wherein the catalyst precursor is molybdenum tris (toluene dithiolate).

3. The process of claim 1 wherein the precursor is molybdenum ortho-aminobenzenethiolate.

4. The process of claim 1 wherein said precursor is molybdenum tris-toluene dithiolate.

5. The process of claim 1 wherein the precursor is rhenium ortho-aminobenzenethiolate.

* * * * *